June 12, 1934.　　C. H. DUELL ET AL　　1,962,860
DISPENSING APPARATUS
Filed Feb. 16, 1932
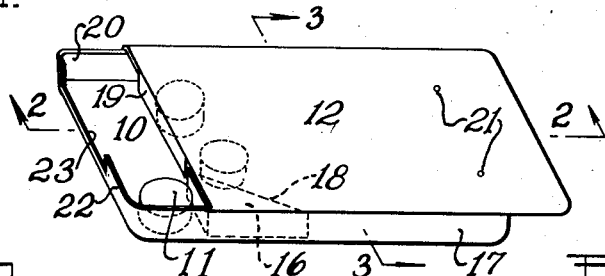
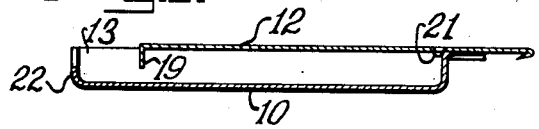
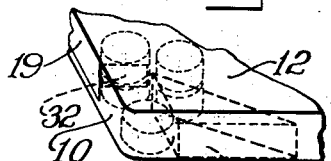
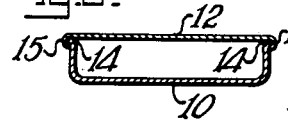
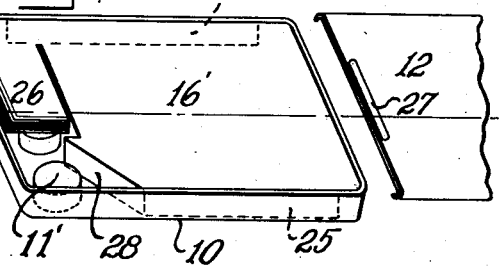
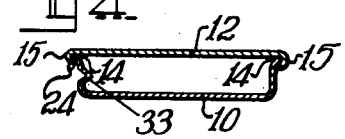
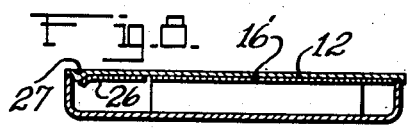
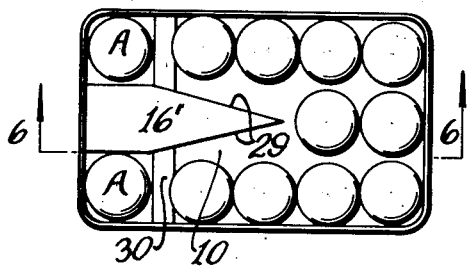
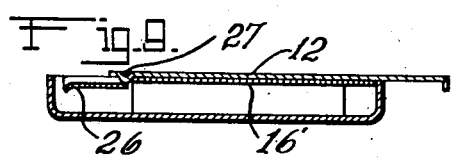
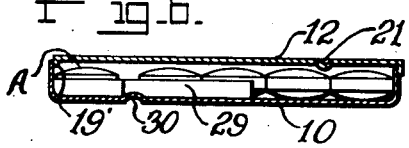
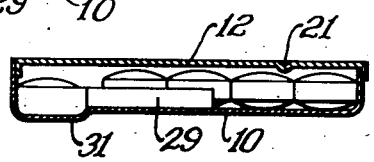

Patented June 12, 1934

1,962,860

UNITED STATES PATENT OFFICE 1,962,860

DISPENSING APPARATUS

Charles H. Duell and Edith E. Brisbane, New York, N. Y., and Douglas C. Clarke, Mountain Lakes, N. J., assignors to International Cosmetic Company, Inc., New York, N. Y., a corporation of New York Application February 16, 1932, Serial No. 593,218

16 Claims. (Cl. 206—42)

This invention relates to a dispensing container, and more specifically to a portable box for successively exposing one or more pills or other articles.

In general, it is an object of the invention to provide a device of the character described, which will efficiently perform the purpose for which it is intended, which is simple and economical of construction, which can be expeditiously and conveniently manipulated, and which is readily manufactured and assembled.

Another object of the invention is to provide a dispensing container which will expose successively a predetermined number of the objects contained.

Another object is to provide a shallow portable dispensing container, which may be held and operated by one hand.

Another object is to provide a portable container, which may be opened by a sliding motion and from which a certain number of objects may be dropped at successive openings.

Another object is to provide a portable container, which locks in by the opening of the cover all but a predetermined number of objects contained.

Another object is to provide a container, which operates with portions of a slidable cover extending therein but which may be originally assembled after filling by snapping the cover on.

Other objects of the invention will in part be obvious and will in part appear hereinafter.

The invention accordingly comprises the features of construction, combinations of elements, and arrangement of parts, which will be exemplified in the construction hereinafter set forth and the scope of the application of which will be indicated in the claims.

For a fuller understanding of the nature and objects of the invention, reference should be had to the following detailed description taken in connection with the accompanying drawing, in which:

Fig. 1 is a perspective view of one form of device constructed in accordance with the invention;

Fig. 2 is a sectional view of the device shown in Fig. 1, taken along the lines 2—2;

Fig. 2a is a perspective view of modified detail of the device shown in Fig. 1;

Fig. 3 is a sectional view of the device shown in Fig. 1 taken along the lines 3—3;

Fig. 4 is a sectional view similar to Fig. 3, showing a modified form of the invention;

Fig. 5 is a plan view of a modification of the device shown in Fig. 1, with cover removed.

Fig. 6 is a sectional view of the device shown in Fig. 5 taken along the line 6—6, with cover attached.

Fig. 7 is a perspective view of a modification of the device shown in Fig. 1, with the cover shown removed and partly broken away;

Fig. 8 is a sectional view of the device shown in Fig. 7, taken along the line 8—8 with the cover in closed position;

Fig. 9 is a sectional view, similar to Fig. 8, of the device shown in Fig. 7, with the cover in partially open position; and Fig. 10 is a sectional view in elevation of a modification of the device shown in Fig. 1, with the cover in closed position.

It is inconvenient to have a plurality of articles simultaneously exposed in a container either when it is carried about on the person or is picked up from a table, because in such cases care must be taken that the articles which are not to be used are not spilled or soiled. For example, one may wish to take single pills from time to time on the street, in the shops or in public conveyances and it is exceedingly awkward to pick one from a loose group. It is also difficult and sometimes impossible to use a container which requires the use of both hands to open it. The present invention provides a shallow container for a plurality of articles such as pills, coins, etc., which may be easily held in one hand and which may be opened by sliding the cover back between the thumb and fingers so as to expose a certain number only of the objects. When these have been removed and the cover slid back again, a slight shake of the box rearranges the contents and upon being reopened, the box again presents the same limited number of fresh units. This process may be continued as long as there are any articles left.

In the embodiment of the invention shown in the drawing, the container 10, adapted to hold a plurality of articles 11, has a cover 12, which slides back and forth to open and close the opening 13. The walls of the container along portions of the periphery of the opening may be bent outward to form a rim 14 which serves as a way. Certain edges 15 of the cover are bent down around this way and are slidable thereon. Within the container is an obstructing member 16 which prevents the contents of the device from having unlimited motion. As shown, it extends outwardly from one wall 17, from bottom to top, leaving a space between its larger end and the adjacent end of the container. The contour of the member may be such as to facilitate the passage of articles around it in one direction, the side 18 thereof meeting the adjacent wall at an obtuse angle and having no abrupt corners. The member 16 may be formed in any convenient way, as by fixedly inserting a separate unit or by striking up the bottom. A simple form could be an inserted partition.

Other suitable means are provided for further limiting the motion of certain of the contents so that they are inaccessible at certain times; for example, integral with or attached to the cover there is a dependent flange 19 extending into the container. This flange may be on one end of the cover and so positioned that when that end is immediately over the member 16 the flange extends from the member to the opposite wall 20, and with it completely divides the container into two compartments, one being open and the other covered. It is unnecessary for the container to be opened any more and the cover may be supplied with means for preventing its being slid farther, e. g., the detents 21, which catch against the end of the container. The flange 19 may engage the member 16 and perform the same function. To assist in assembling the device, the end wall 22 of the container may be cut away at 23 to allow the flange 19 to pass into the container. The portion cut away may be somewhat smaller than the flange with the result that the latter may be sprung past the wall 22 in the first place, but that thereafter the wall will offer sufficient resistance to prevent the cover from sliding off that end when it is desired to maintain the container closed as a whole.

The operation of the device is as follows: The container is filled and the cover slid on. It may be now held in one hand so that a motion of the thumb and fingers causes the cover to slide and expose a portion of the interior of the container. The flange depending from the cover, as it moves pushes any articles before it into the covered portion of the container. The one or more articles lying between the member 16 and the end wall 22, which were not displaced by the depending flange, are fully exposed. The number of these depends on the relative dimensions of the device and the articles. The entire container may be inverted and a predetermined number of articles will fall out. The cover is slid to closed position and a slight motion of the container will cause other articles to move around the obstructing member 16 into the position of those which have been dispensed. The process may be repeated at any later period.

In cases where very thin articles are to be packed in the container two or more deep, see Fig. 2a, it may be convenient to have a second flange or rib 32 attached to the cover in such a position that when the cover is closed, but a single article at a time can move beneath the second flange and into that portion of the container which is exposed when the cover is opened.

The obstructing member 16 may be variously positioned and shaped. In Fig. 5 a modification is shown wherein the member 16' extends from the central portion of that end of the container exposed when the cover 12 is slid open. The sides 29 of the member present surfaces adapted for guiding the articles whenever they are given a motion toward that end of the container. The floor of the container is so shaped that when the cover 12 is withdrawn a certain amount, one or more flanges 19' depending from the cover approach near enough the floor to prevent articles from passing certain points into the open end. When the cover is closed, however, the formation of the floor does not prevent articles from moving freely into that portion of the container which is to be exposed, nor do the flanges disturb those articles already in that position, as the cover is slid open. For example, the floor may be struck up in the shape of a rib 30. This rib and the flanges 19' permit the articles to take the position A when the cover is closed as in Fig. 6. The cover may be opened a given distance (limited by means such as the detents 21), so as to expose but not disturb the articles in that position. The remaining articles are then unable to pass between the flanges and the rib. The member 16' may occupy one corner of the container and have but one guiding face 29, or the rib 30 may extend from the member 16' to one side wall, that flange 19' which extends between the member 16' and the opposite wall being deep enough to push all the articles on that side into the closed part of the container as the cover is opened.

It may be desired, as shown in Fig. 10, to omit the rib but to countersink that portion 31 of the floor of the container from which the articles are to be dispensed. As the cover is opened in this latter case the flange does not touch the articles in the countersunk portion but does prevent other articles from reaching that portion. In this form of container the member 16' may be omitted.

With the modification of the cover shown in Fig. 4, suitable means are provided whereby the cover 12 is originally put on by snapping over the top. At least one of the bent-down edges 15 of the cover may have one part of its inner surface 24 directed at an angle downwardly away from the rim 14, over which the edge is to fit. As this surface is pressed against the way the resultant force spreads the edge until it slips down over. Means may be provided for assisting in completely removing the cover when it is desired to inspect the article remaining in the container. The wall below the rim 14, for example, may have a protuberance or indentation 33 upon which a finger or nail of one hand may grip while the other hand is springing the cover off.

The device may be so constructed that the opening of the cover operates means within the container for preventing more than a given number of articles from being exposed. In the modification shown in Figs. 5, 7, 8 and 9, for example, the obstructing member 16' may suitably be fixed beneath the cover and above the articles 11. It may be supported by depending sides 25 or by frictional engagement with the walls of the container. The member 16' may have a section 26 at one end of the container adapted to be flexed downward by a detent 27 in the cover. The cover need only slide far enough to open one end of the container. In this end there will be space enough for certain articles 11' not covered by the member and/or the flexible section 26. When the cover is opened the flexed section and a second wall section 28 extending down from the member, prevent more articles from replacing the articles 11' as they are removed. The wall section 28 may be at such an angle as to facilitate the movement of articles thereabout when the cover is closed. The operation of this modification will be apparent. When the cover is closed, a proper shake of the container shifts a certain number of articles into the uncovered portion.

The cover is slid open, pressing down the flexible section 26 of the member 16'. The articles 11' may be removed, but no more may come into the uncovered space which is surrounded by the flexible section and the second section 28. When the cover is shut the flexible section rises, permitting the entire cycle to be repeated.

The apparatus above described is peculiarly adapted, among other things, for the dispensing of pills. Travelers and those who are ill, as well as those in crowds, may quickly and easily dispense only that number of pills required. The danger of losing or contaminating the rest is eliminated. There is no cover to be opened with a snap or jerk, which might throw the entire contents out. Such a device for rapid quiet dispensing, has many other uses and applications.

The scope of the invention is not limited by the size of the articles to be dispensed. Pills, for example, may be quite minute and the predetermined number to be dispensed upon any one opening of the cover may in such instances be thought of as a predetermined quantity. The articles referred to above may range down to particle size. They may be ground coffee, sugar, salt, etc. They may be granular or as fine as flour. It is contemplated that devices embodying the invention may be attached to or incorporated in relatively large containers such as coffee cans or sugar bowls whereby a certain amount is exposed whenever a member is slid back. The small form of the devices described above might have an opening leading from the main supply in the larger receptacle so that the former would be constantly replenished as successive relatively small amounts are removed. If the various moving parts and contacting surfaces are made liquid tight the device is susceptible to use in dispensing fluids. Throughout the specification and claims the terms "plurality of articles" and "predetermined number" are intended to embrace "quantity of material" and "predetermined amount" respectively.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent, is:

1. In a container, in combination, a cover for said container adapted when in open position to uncover a portion of said container, barrier means within said container and extending transversely of said container, said barrier means comprising a plurality of elements, at least one of said elements being movable with said cover, said elements cooperating, when said cover is in open position, to prevent material from entering the uncovered portion of said container.

2. In a container, in combination, a cover for said container adapted when in open position to uncover a portion of said container, barrier means within said container and extending transversely of said container, said barrier means comprising a plurality of elements, at least one of said elements being fixedly positioned within said container and another of said elements being movable with said cover, said elements cooperating, when said cover is in open position, to prevent material from entering the uncovered portion of said container.

3. In a device of the character described, the combination comprising means adapted for containing a plurality of articles, a cover for said containing means adapted for uncovering a portion thereof, and barrier means within said containing means, a portion at least of said barrier means being movable with said cover, the portion of the containing means uncovered by moving the cover to open position being defined at least in part by a portion of said barrier means, said uncovered portion connecting with the remainder of said containing means whenever the cover is in closed position, the barrier means closing the uncovered portion from the remainder of said containing means when the cover is in open position.

4. In a device of the character described, the combination comprising means adapted for containing a plurality of articles, barrier means within said containing means and extending transversely thereof, a cover for said containing means adapted for uncovering a portion of said containing means, said portion being adapted to contain a predetermined number of said articles and being at least in part defined by said barrier means, and means movable with said cover and adapted to cooperate with said barrier means, only when said cover is in open position, to separate said uncovered portion from the remainder of said containing means.

5. In a device of the character described, the combination comprising means adapted for containing a plurality of articles, barrier means within said containing means and adapted to divide said containing means into a plurality of communicating portions, a cover for said containing means, and means attached to said cover and adapted, when said cover is in open position, to prevent communication between said portions.

6. In a device of the character described, the combination comprising means adapted for containing a plurality of articles, barrier means within said containing means, a cover for said containing means adapted for being removed a predetermined amount, and a flange attached to said cover adapted for moving all but a predetermined number of said articles from that portion of said containing means uncovered by a motion of said cover into another portion of said containing means, said flange and said barrier means forming a wall within said containing means when said cover is partially moved aside whereby all but said predetermined number of said articles are retained within said containing means.

7. In a device of the character described, the combination comprising containing means adapted for containing a plurality of articles, a cover for said containing means movable to uncover a portion of said containing means, a wall in said containing means separating, for a predetermined position of said cover, the uncovered portion from the covered portion, said wall comprising barrier means within said containing means and a flange movable with said cover, and said flange being adapted for moving, as said cover is being opened, all but a predetermined number of said articles from said uncovered portion into said covered portion.

8. In a device of the character described, the combination comprising means adapted for containing a plurality of stacks of articles, barrier means within said containing means, a cover for said containing means adapted for being moved a predetermined amount, means attached to said cover adapted for moving into another portion of said containing means all but a predetermined number of said articles from that portion of said containing means uncovered by a motion of said cover, and other means attached to said cover and comprising a flange and adapted, when said cover is closed, to permit a number of articles less than the number in one of said stacks to pass into that portion of said containing means wherein they will be exposed when said cover is opened.

9. In a device of the character described, the combination comprising a shallow portable container for a plurality of articles, barrier means fixed in said container and extending transversely thereof, a cover limitedly slidable to uncover a portion of said container, a flange on said cover and movable therewith and extending into said container, said flange and said member forming a partition adapted for dividing said container into two non-communicating parts when said cover is in open position.

10. In a device of the character described, the combination comprising a container for articles, a guide therein, a slidable cover provided with a pusher, said pusher adapted to fit with said guide when said cover is open and to form therewith barrier means dividing said container into a plurality of non-communicating portions, one of said portions being uncovered and adapted to contain a predetermined number of articles.

11. In a device of the character described, the combination comprising a container provided with an opening, ways on said container, a slidable cover adapted to be retained by said ways, a projection on said cover adapted for protruding into the chamber formed by said container, barrier means within said container and positioned to cooperate with said projection and to form therewith a partition dividing said container into a plurality of non-communicating portions when the cover is opened, and a flexible extension on said cover adapted for being sprung over one of said ways and for slidably gripping said way.

12. In a device of the character described, the combination comprising a container for a plurality of articles and having an opening, a slidable cover provided with a detent, a member disposed within said container adapted for covering all but a part of said opening when said cover is in open position, said part being adapted to expose a predetermined number of said articles, said member provided with a section adapted to be operated by said detent when said cover is in open position for obstructing the passage of any of said articles past said section toward said uncovered part of said opening.

13. In a device of the character described, the combination comprising a container for a plurality of articles and having an opening, a slidable cover provided with a detent, a member disposed within said container adapted for covering all but a part of said opening when said cover is in open position, said part being adapted to expose a predetermined number of said articles, said member provided with a section adapted to be operated by said detent when said cover is in open position for obstructing the passage of any of said articles past said section toward said part of said opening, and with a second section permanently obstructing the passage of any of said articles.

14. In a device of the character described, the combination comprising a container for a plurality of articles and having an opening, a slidable cover provided with a detent, a member disposed within said container adapted for covering all but a part of said opening when said cover is in open position, said part being adapted to expose a predetermined number of said articles, said member provided with a section adapted to be operated by said detent when said cover is in open position for obstructing the passage of any of said articles past said section into said part, and with a second section permanently forming a wall of said part, said second section being arranged for facilitating the passage of said articles around said second section when said cover is closed.

15. In a device of the character described, the combination comprising a container for articles, a member therein providing one or more guiding surfaces, corresponding portions of said container adapted for receiving a certain number of said articles, barrier means extending transversely of said container between said portions and the remainder of said container, a slidable cover, means associated with said cover adapted to cooperate with said barrier for blocking the passage of said articles past said barrier to said portions when said cover is slid to uncover said portions.

16. In a device of the character described, the combination comprising a container for articles, portions of said container adapted for receiving a certain number of said articles, barrier means extending transversely of said container between said portions and the remainder of said container, a slidable cover, means movable with said cover adapted to cooperate with said barrier means for blocking the passage of said articles past said barrier to said portions when said cover is slid to uncover said portions.

CHARLES H. DUELL.
DOUGLAS C. CLARKE.
EDITH E. BRISBANE.